(12) United States Patent
Lee et al.

(10) Patent No.: US 8,428,341 B2
(45) Date of Patent: Apr. 23, 2013

(54) APPARATUS FOR CALCULATING 3D SPATIAL COORDINATES OF DIGITAL IMAGES AND METHOD THEREOF

(75) Inventors: Seongho Lee, Daejeon (KR); Jaechul Kim, Daejeon (KR); Yoonseop Chang, Daejeon (KR); Kyungok Kim, Daejeon (KR); Jonghyun Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 762 days.

(21) Appl. No.: 12/606,293

(22) Filed: Oct. 27, 2009

(65) Prior Publication Data

US 2010/0142802 A1    Jun. 10, 2010

(30) Foreign Application Priority Data

Dec. 8, 2008 (KR) ........................ 10-2008-00124123
Apr. 21, 2009 (KR) ........................ 10-2009-0034709

(51) Int. Cl.
*G06K 9/00* (2006.01)
(52) U.S. Cl.
USPC ........................................................ 382/154
(58) Field of Classification Search ............. 382/151, 382/154, 201, 216; 348/42, 47–50; 345/419–420
See application file for complete search history.

(56) References Cited

U.S. PATENT DOCUMENTS

| 7,747,150 B2 * | 6/2010 | Anai et al. ..................... 396/55 |
| 7,860,273 B2 * | 12/2010 | Kochi et al. ................... 382/103 |
| 8,121,353 B2 * | 2/2012 | Kim et al. ..................... 382/113 |
| 2006/0215027 A1 | 9/2006 | Nonoyama et al. |
| 2008/0069449 A1 | 3/2008 | Cho et al. |
| 2008/0095402 A1 | 4/2008 | Kochi et al. |

FOREIGN PATENT DOCUMENTS

| JP | 2004-226190 | 8/2004 |
| JP | 2008-89314 | 4/2008 |
| JP | 2008-252391 | 10/2008 |
| KR | 10-2006-0018847 | 3/2006 |
| KR | 10-2008-0026003 | 3/2008 |

* cited by examiner

*Primary Examiner* — Daniel Mariam
(74) *Attorney, Agent, or Firm* — Staas & Halsey LLP

(57) ABSTRACT

Provided is a digital photographing apparatus including: an image acquiring unit that acquires images by photographing a subject; a sensor information acquiring unit that acquires positional information, directional information, and posture information of the digital photographing apparatus at the time of photographing a subject; a device information acquiring unit that acquires device information of the digital photographing apparatus at the time of photographing a subject; and a spatial coordinates calculator that calculates 3D spatial coordinates for photographed images using the acquired positional information, directional information, posture information, and device information.

7 Claims, 8 Drawing Sheets

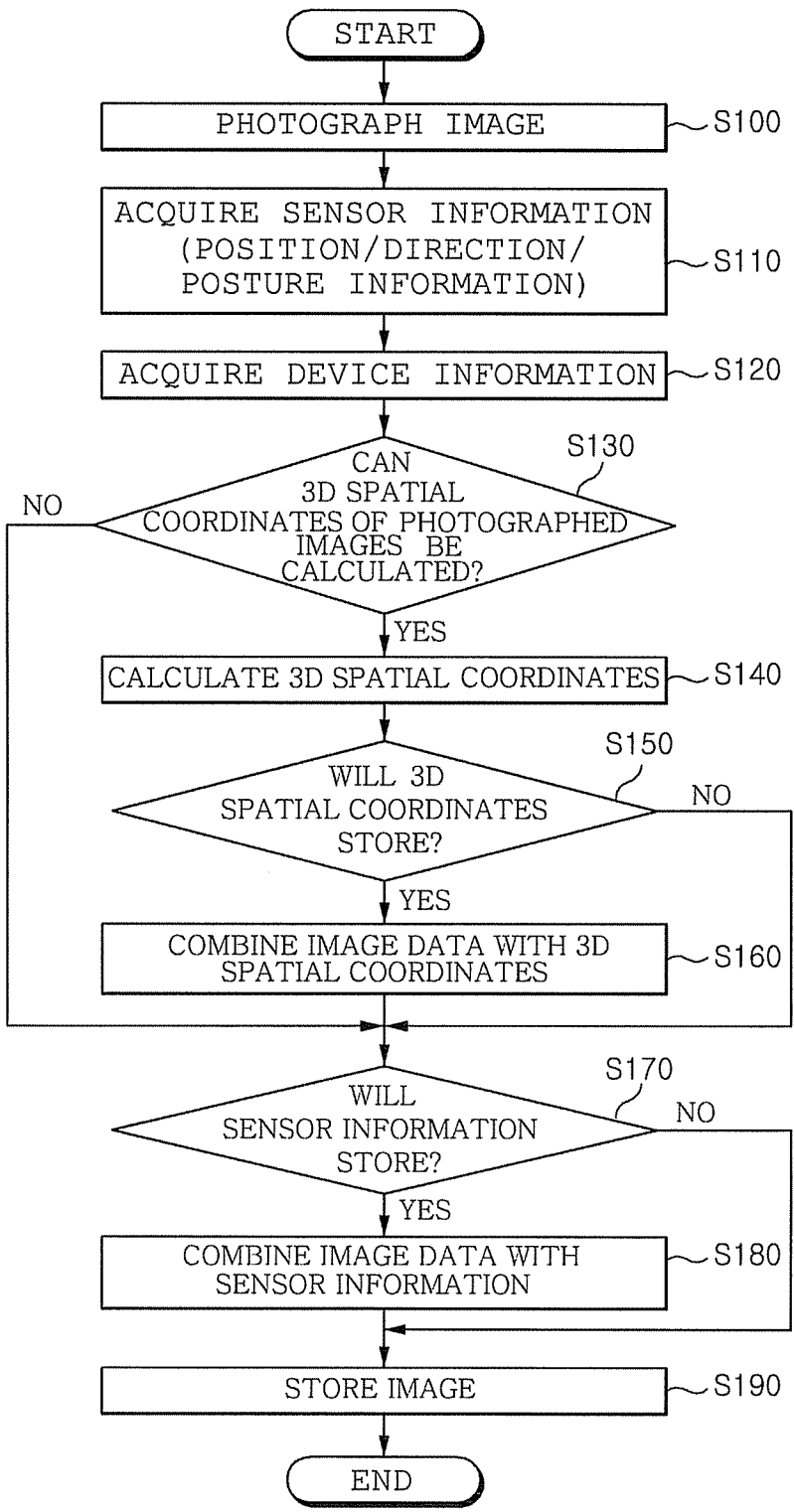

APPARATUS FOR CALCULATING 3D SPATIAL COORDINATES OF DIGITAL IMAGES AND METHOD THEREOF

RELATED APPLICATIONS

The present application claims priority to Korean Patent Application Serial Number 10-2008-0124123, filed on Dec. 8, 2008 and Korean Patent Application Serial Number 10-2009-0034709, filed on Apr. 21, 2009, the entirety of which are hereby incorporated by references.

BACKGROUND OF THE INVENTION

1. Field of the Invention

The present invention relates to a digital photographing apparatus and a method thereof. More specifically, the present invention relates to a digital photographing apparatus for calculating 3D spatial coordinates of digital images and a method thereof.

2. Description of the Related Art

Recently, a digital photographing apparatus (for example, digital camera, camcorder, CCTV, etc.), which is frequently used by an expert and the public, is combined with various sensors to provide various information to a user. For example, information on a place taking a picture, etc., combined with a photograph image file photographed by a digital camera is provided to a user, such that the user can accurately recognize while taking a picture.

Images photographed by the digital photographing apparatus often stores images themselves as well as various information associated therewith. A JPEG, TIFF, Rev.6.0, RIFF, WAVE file format, which is an image file photographed by the digital camera is stored with exchangeable image file format (Exif) information. The Exif includes camera setting information such as date and time information, shutter speed, luminescence mode, etc., photographed regional information, and the like.

Further, Open Geospatial Consortium (OGC) can be used as the international standard, which can insert Geography Markup Language (GML) information in JPEG2000 file format. According to this tendency, a need exists for a digital photographing apparatus capable of calculating 3D spatial information of photographed images and storing the calculated 3D spatial information together with image data so that they can be usefully used in a geographic information system (GIS), a location based service (LBS), a telematics service, a monitoring service, etc.

According to the related art, a digital photographing apparatus that measures a distance from a subject by a laser beam and calculates a distance from a specific object (subject) based on each pixel of captured images has been disclosed.

However, in the case of the foregoing digital photographing apparatus according to the related art, because an apparatus for outputting/processing a relatively expensive laser beam, etc., is used, the price of the photographing apparatus greatly increases and parameters to be considered are increased according to the shape of the photographed subject, which consumes much time to obtain the spatial information on the photographed images.

SUMMARY OF THE INVENTION

The present invention proposes to solve the above problems.

It is an object of the present invention to provide a digital image photographing apparatus capable of calculating 3D spatial coordinates of each vertex of photographed digital images using various device information (focal length, lens specification, view angle, etc.) of the digital photographing apparatus and positional information, directional information, and posture information of the digital photographing apparatus that are acquired by sensors to provide 3D spatial information, which can be usefully used in a geographic information system (GIS), a location based service (LBS), a telematics service, a monitoring service, etc., together with the photographed images.

A digital photographing apparatus according to the present invention is a digital photographing apparatus for calculating 3D spatial coordinates of digital images. The digital photographing apparatus includes: an image acquiring unit that acquires images by photographing a subject; a sensor information acquiring unit that acquires positional information, directional information, and posture information of the digital photographing apparatus at the time of photographing a subject; a device information acquiring unit that acquires device information of the digital photographing apparatus at the time of photographing a subject; and a spatial coordinates calculator that calculates 3D spatial coordinates of photographed images using the acquired positional information, directional information, posture information, and device information.

In particular, the spatial coordinates calculator calculates the 3D spatial coordinates of a geographical region for each vertex of the images.

Further, the device information of the digital photographing apparatus includes at least one of view angle information, focal length information, expansion information, and reduction information.

In addition, the directional information of the digital photographing apparatus is yaw angle information of the digital photographing apparatus.

Moreover, the posture information of the digital photographing apparatus is roll angle information and pitch angle information of the digital photographing apparatus.

Further, the sensor information acquiring unit includes a positional information acquiring unit and the positional information acquiring unit acquires the positional information of the digital photographing apparatus using information received from any one of a GPS satellite, a Galileo satellite, and a GLONASS satellite.

Also, the digital photographing apparatus further includes an image output unit that displays the 3D spatial coordinates of images together with the images.

In addition, the sensor information acquiring unit includes a directional information acquiring unit and the directional information acquiring unit acquires the directional information of the digital photographing apparatus using a geomagnetic sensor.

Further, the sensor information acquiring unit includes a posture information acquiring unit and the directional information acquiring unit acquires the posture information of the digital photographing apparatus using a tilt sensor.

Moreover, the digital photographing apparatus further includes a data storage unit that stores at least one of the acquired positional information, directional information, posture information, device information, and 3D spatial coordinates of the images together with the photographed images.

An image photographing method of the present invention is an image photographing method of a digital photographing apparatus. The image photographing method includes: acquiring images by photographing a subject; acquiring positional information, directional information, and posture information of the digital photographing apparatus at the time of photographing a subject; calculating 3D spatial coordinates of photographed images using the acquired positional information, directional information, posture information, and device information; and storing the calculated 3D spatial coordinates together with the photographed images.

In particular, the calculating the 3D spatial coordinates calculates the 3D spatial coordinates of a geographical region for each vertex of the photographed images.

In addition, the image photographing method further includes displaying the calculated 3D spatial coordinates together with the photographed images.

Further, the image photographing method further includes at least one of the acquired positional information, directional information, posture information, and device information together with the photographed images.

Moreover, the device information of the digital photographing apparatus includes at least one of view angle information, focal length information, expansion information, and reduction information.

Also, the directional information of the digital photographing apparatus is yaw angle information of the digital photographing apparatus.

Further, the posture information of the digital photographing apparatus is roll angle information and pitch angle information of the digital photographing apparatus.

The present invention has the following effects.

The present invention calculates 3D spatial coordinates of each vertex of photographed digital images using various device information of the digital photographing apparatus and positional information, directional information, and posture information of the digital photographing apparatus that are acquired by sensors, making it possible to rapidly calculate and provide the spatial information of the photographed digital images. The present invention can implement the apparatus for providing 3D spatial information of images at relatively low cost as compared to the scheme using the laser beam according to the related art.

In addition, the present invention accurately maps the photographed image using the 3D spatial coordinates of the photographed images with the real geographical features, making it possible to increase utilization of the 3D virtual space service or the downtown monitoring service.

BRIEF DESCRIPTION OF THE DRAWINGS

FIG. 8 is a flowchart for explaining a photographing method of the digital photographing apparatus according to the present invention.

DETAILED DESCRIPTION OF THE PREFERRED EMBODIMENTS

Figure 1:
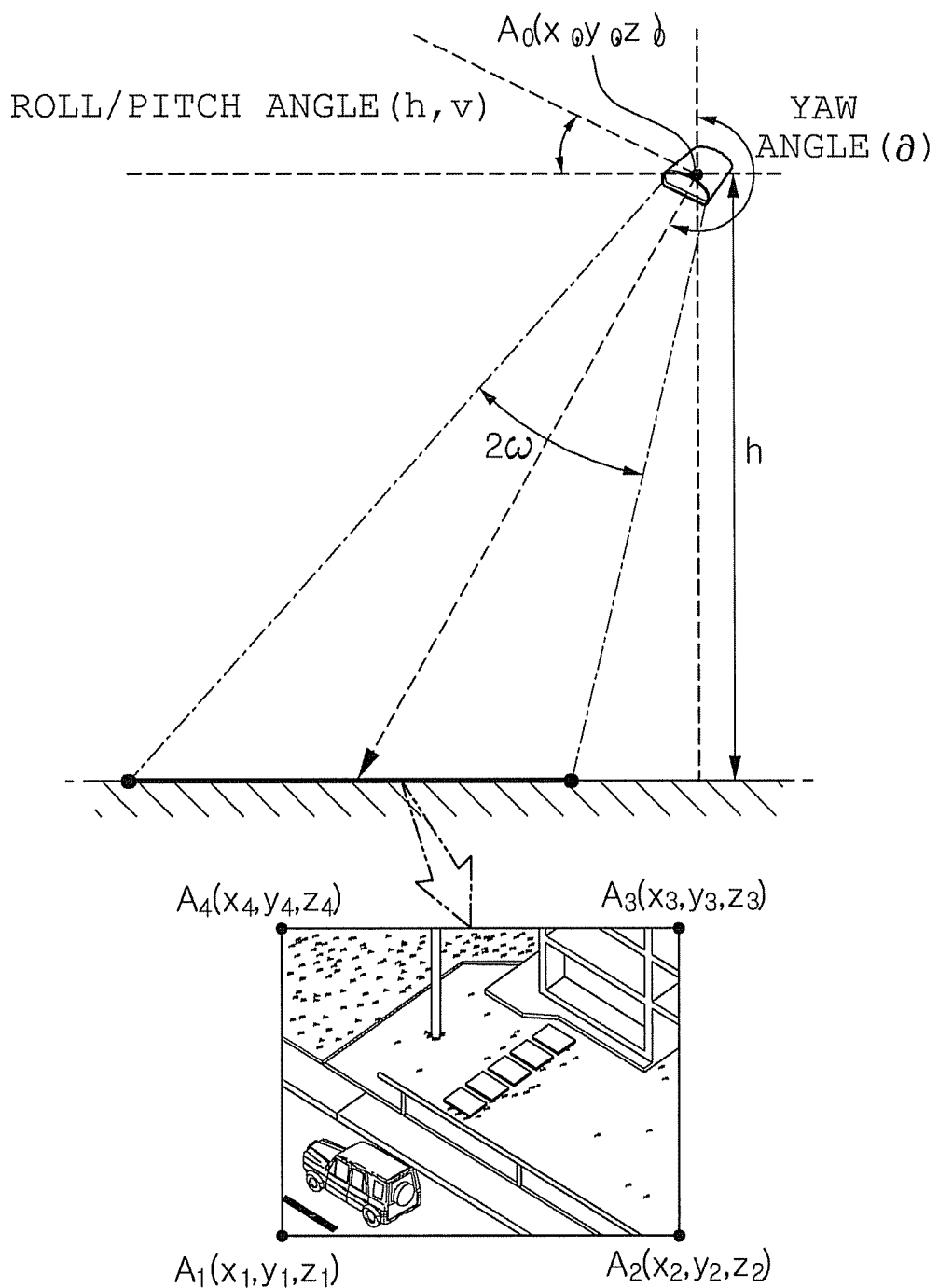
FIG. 1 is an exemplary diagram for schematically explaining a process of calculating 3D spatial coordinates of digital images by a digital photographing apparatus according to one embodiment of the present invention.

The present invention will be described below with reference to the accompanying drawings. Herein, the detailed description of a related known function or configuration that may make the purpose of the present invention unnecessarily ambiguous in describing the present invention will be omitted Exemplary embodiments of the present invention are provided so that those skilled in the art may more completely understand the present invention. Accordingly, the shape, the size, etc., of elements in the drawings may be exaggerated for explicit comprehension.

FIG. 1 is a diagram for schematically explaining a digital photographing apparatus according to one embodiment of the present invention.

The digital photographing apparatus according to the present invention calculates 3D spatial coordinates of each vertex of photographed images using device information (including lens information, view angle, expansion/reduction information, etc., of the digital photographing apparatus) of the digital photographing apparatus that are acquired at the time of photographing and positional information, directional information (for example, azimuth angle), and posture information of the digital photographing apparatus that are acquired at the time of photographing as parameters. The digital photographing apparatus can include the calculated spatial coordinates in the digital image data and store them or can display them to a user through the display unit. The detailed configuration of the digital photographing apparatus according to the present invention will be described in detail with reference to FIG. 2.

Figure 2:
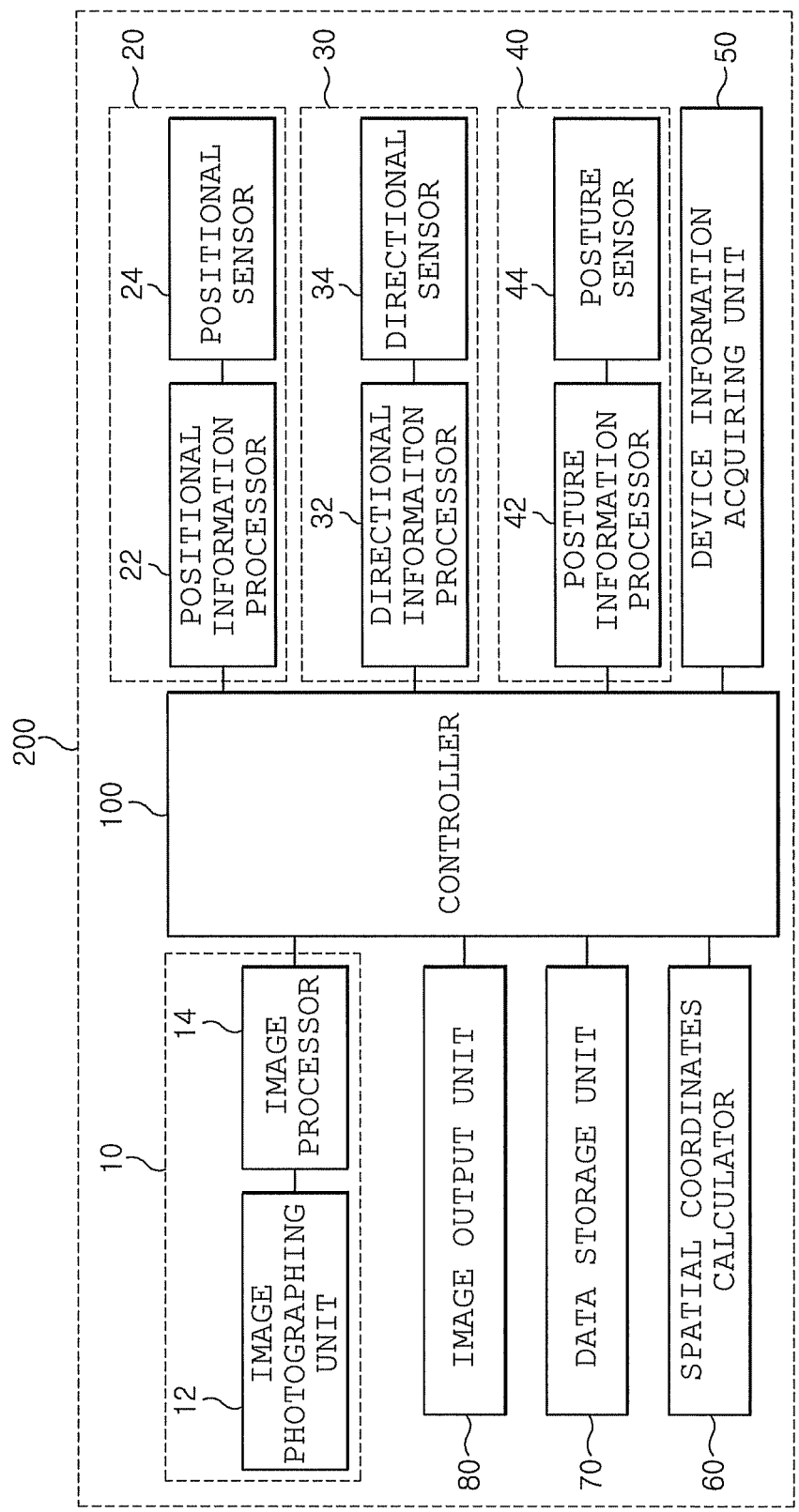
FIG. 2 is a block diagram for explaining in detail a configuration of the digital photographing apparatus according to one embodiment of the present invention.

FIG. 2 is a diagram for explaining in detail a configuration of the digital photographing apparatus according to one embodiment of the present invention; Referring to FIG. 2, a digital photographing apparatus 200 according to the present invention includes an image acquiring unit 10, a positional information acquiring unit 20, a directional information acquiring unit 30, a posture information acquiring unit 40, a device information acquiring unit 50, a spatial coordinates calculator 60, a data storage unit 70, an image output unit 80, and a controller 100. The digital photographing apparatus 200 includes several components other than components shown, but only components necessary to understand the present invention will be shown and described.

The image acquiring unit 10 photographs a subject to acquire the digital image data and transmits the acquired digital image data to the controller 100. To this end, the image acquiring unit 10 includes an image photographing unit 12 and an image processor 14.

In more detail, the image photographing unit 12 photographs an image of a subject positioned at a line of sight direction and converts the photographed images into digital data. To this end, the image photographing unit 12 basically includes a camera lens, a CCD imaging device that photographs light input through the camera lens, a CCD driver that drives the CCD imaging device, a timing controller that generates various timing signals such as signals controlling an imaging time, a noise remover that samples the imaging signals acquired by the CCD imaging device and removes noise, and an A/D converter that converts the removed imaging signals into digital and outputs them.

The images photographed through the image photographing unit 12 are converted through the image processor 14, which are in turn output to the controller 100. For example, the image processor 14 converts the digital image data photographed through the image photographing unit 12 into a standard scheme such as JPEG, MPEG4, H.264, etc. and outputs them to the controller 100 in order to meet a format set by a user or increase a storage number.

The positional information acquiring unit 20 acquires the positional information of the digital imaging apparatus 200 according to the control signal from the controller 100 and transmits it to the controller 100. The controller 100 outputs the control signals to the positional information acquiring unit 20 at the time of photographing (for example, the time when the photographing instruction is input from the user) to acquire the positional information. The positional information acquiring unit 20 acquires 3D spatial coordinates ($A_0$) of the digital photographing apparatus at the time of photographing according to the control signals from the controller 100 and transmits it to the controller 100. To this end, the positional information acquiring unit 20 includes a positional sensor 24 and a positional information processor 22.

The positional sensor 24 measures a position of a digital photographing apparatus 200 according to the control signals from the controller 100. For example, the positional sensor 24 may be a sensor that receives positional information from a GPS, Galileo, or GLONASS satellite. The positional information measured by the positional sensor 24 is transmitted to the positional information processor 22 and processed with a predetermined format. In other words, the positional information processor 22 converts the positional information measured by the positional sensor 24 into a format that can be stored together with the digital image data and transmits them to the controller 100.

The directional information acquiring unit 30 acquires the photographing direction (azimuth angle or yaw angle $\partial$) of the digital imaging apparatus 200 according to the control signal from the controller 100 and transmits it to the controller 100. In more detail, the controller 100 outputs the control signals to the directional information acquiring unit 30 at the time of photographing to acquire the directional information. The directional information acquiring unit 30 measures the photographing direction of the digital imaging apparatus 200 according to the control signal from the controller 100 and acquires the directional information and transmits it to the controller 100. To this end, the directional information acquiring unit 30 includes a directional sensor 34 and a directional information processor 32.

The directional sensor 34 measures the photographing direction of a digital photographing apparatus 200 according to the control signals from the controller 100.

For example, the directional sensor 34 may be an electrical compass, such as a geomagnetic sensor or a digital azimuth sensor, etc. The directional information measured by the directional sensor 34 is transmitted and processed to the directional information processor 32. The directional information processor 32 converts the directional information measured by the directional sensor 34 into a format that can be stored together with the digital image data and transmits it to the controller 100. The posture information acquiring unit 40 acquires the posture information [(left and right tilt angle (roll angle) h/front and rear tilt angle (pitch angle) v] of the digital imaging apparatus 200 according to the control signal from the controller 100 and transmits it to the controller 100. The controller 100 outputs the control signals to the posture information acquiring unit 40 at the time of photographing to acquire the posture information.

The posture information acquiring unit 40 acquires the posture information at the time of photographing according to the control signals from the controller 100 and transmits it the controller 100. To this end, the posture information acquiring unit 40 includes a posture sensor 44 and a posture information processor 42.

The posture sensor 44 measures the roll angle (h) and the pitch angle (v) of the digital photographing apparatus 200 according to the control signals from the controller 100. For example, the posture sensor 44 may be a tilt sensor. The posture information measured by the posture sensor 44 is transmitted and processed to the posture information processor 42. The posture information processor 42 converts the posture information measured by the posture sensor 44 into a format that can be stored together with the digital image data and transmits it to the controller 100.

In the present invention, the foregoing positional information acquiring unit 20, directional information acquiring unit 30, and posture information acquiring unit 40 are collectively referred to as a sensor information acquiring unit.

The device information acquiring unit 50 extracts and manages the device information (for example, view angle information according to lens specification, focal length information, zoom in/zoom out by the operation of a user, etc.) of the digital photographing apparatus 200 at the time of photographing and transmits the extracted device information to the controller 100, such that the 3D spatial coordinates calculation of the photographed images can be performed.

The spatial coordinates calculator 60 calculates the 3D spatial coordinates of a geographical region of each vertex of the photographed images using the positional information, directional information, posture information, and device information that are obtained through the positional information acquiring unit 20, the directional information acquiring unit 30, the posture information acquiring unit 40, and the device information acquiring unit 50. For example, when the photographed images is a square having a predetermined ratio of width*length, the 3D spatial coordinates of four vertexes are calculated.

The process of calculating the 3D spatial coordinates of each vertex of the photographed images by the spatial coordinates calculator 60 will be described in more detail with reference to FIGS. 3 to 7.

The data storage unit 70 stores the images photographed through the image photographing unit 12 as the digital image data and stores contents set by the user. The digital image data can be stored in a removable memory card (for example, USB, SD memory, etc) or the internal memory of the digital photographing apparatus 200. In addition, the digital image data stored in the data storage unit 70 may include the 3D spatial coordinates of the images calculated through the spatial coordinates calculator 60 and the positional information, directional information, and posture information of the digital photographing apparatus 200 at the time of photographing. The digital image data stored in the data storage unit 70 can be displayed through the image output unit 80.

The image output unit 80 extracts the digital image data stored in the data storage unit 70 and displays them to the user.

The controller 100 controls each unit described above. In more detail, the controller 100 receives the positional information, directional information, posture information, and device information of the digital photographing apparatus 200 from the positional information acquiring unit 20, the directional information acquiring unit 30, the posture information acquiring unit 40, and the device information acquiring unit 50 and transfers them to the spatial coordinates calculator 60 so that the 3D spatial coordinates of each vertex of the photographed images can be calculated in the spatial coordinates calculator 60.

FIGS. 3 to 7 are a diagram for explaining in detail a process of calculating the 3D spatial coordinates of each vertex of the photographed images using the positional information, directional information, posture information, and device information of the digital photographing apparatus 200 by a spatial coordinates calculator 60; and the following case is a case that photographs the subject northward in the northern hemisphere and then calculates the 3D spatial coordinates of the photographed images. Meanwhile, the spatial coordinates calculating method as described below is only one embodiment and can calculate the 3D spatial coordinates of the photographed images through various methods by the following embodiments.

Figure 3:
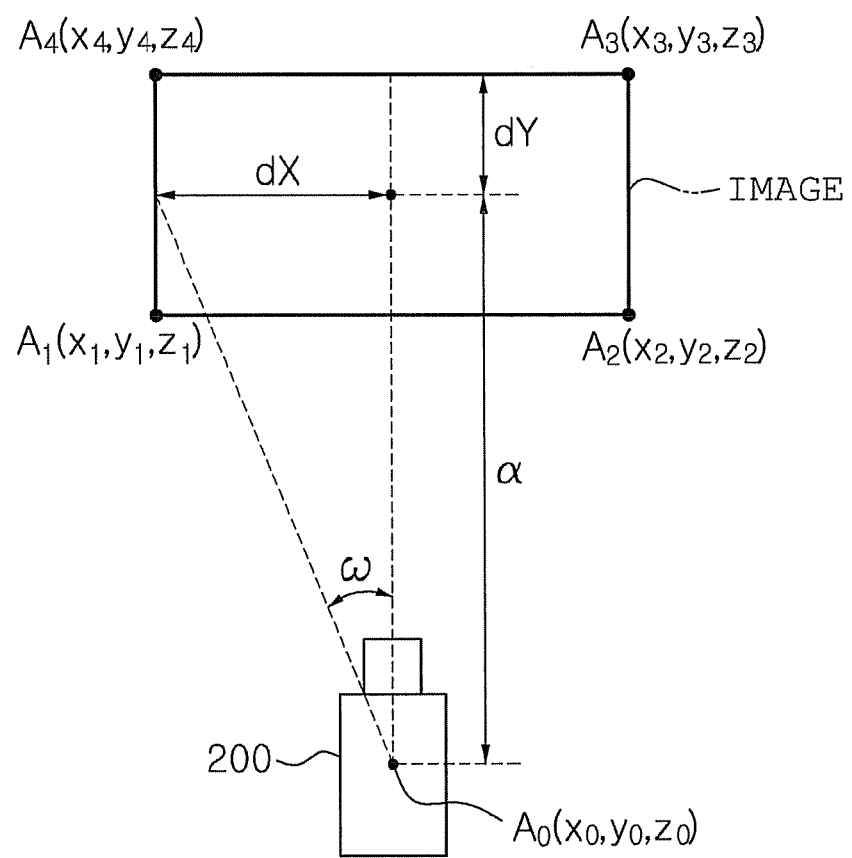
FIGS. 3 to 7 is a diagram for explaining in detail a process of calculating 3D spatial coordinates of vertexes of photographed images using positional information, directional information, posture information, and device information of the digital photographing apparatus by a spatial coordinates calculator.
Figure 4:
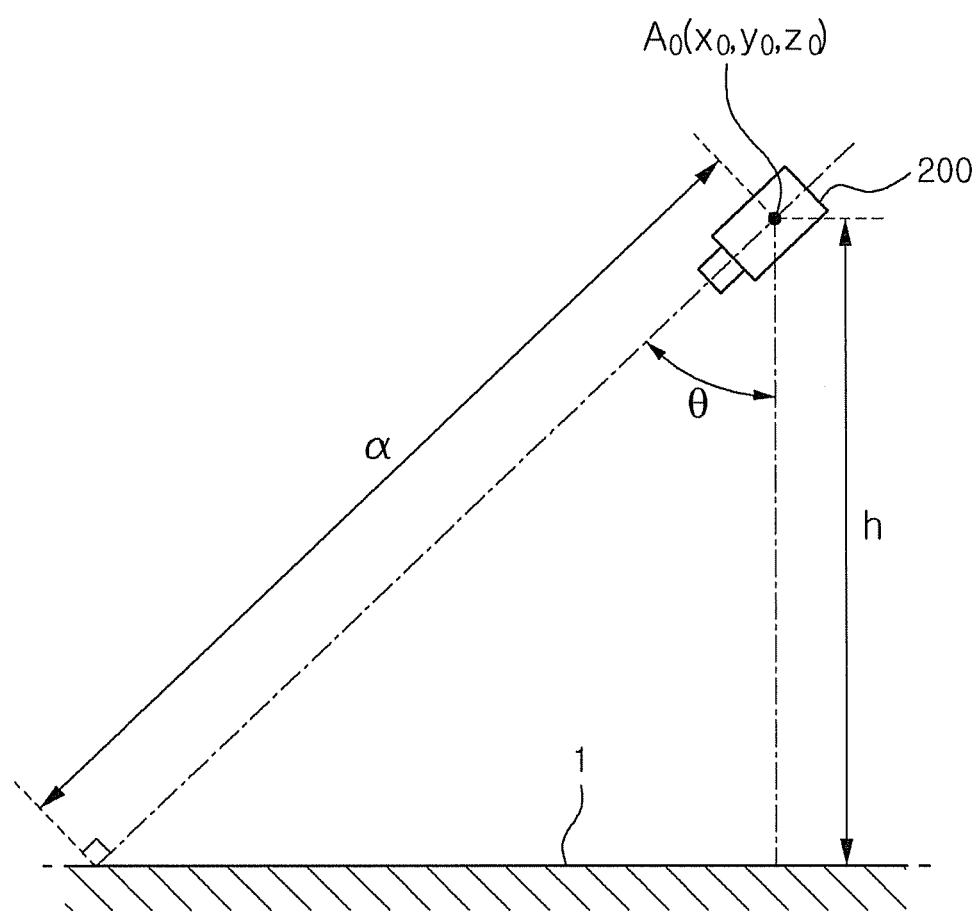

FIG. 3 is a diagram showing a shape where a scene photographed by the digital photographing apparatus 200 according to the present invention is viewed from top to bottom. FIG. 4 is a diagram showing a shape where a scene photographed by the digital photographing apparatus 200 according to the present invention is viewed from a side.

Referring to FIGS. 3 and 4, the digital photographing apparatus 200 has a view angle ($2\omega$). The view angle means a width of a background (landscape) that can be included in one frame (screen). In other words, as the view angle is getting larger, the width of the background that can be included in one screen is increased. In general, a case of a fish-eye lens has the view angle of 180° or more and a case of a standard lens has the view angle of 40° to 60°.

It is assumed that the positional information of the digital photographing apparatus 200 is $A_0(x_0, y_0, z_0)$, the height from the ground 1 to the digital photographing apparatus 200 is h, the pitch angle of the digital photographing apparatus 200 is $\theta$ and the roll angle is 0°. As described above, $A_0(x_0, y_0, z_0)$ can be obtained through the positional information acquiring unit 20 and the height h can be derived through $z_0$. The pitch angle $\theta$ can be obtained through the posture information acquiring unit 40.

Then, $\alpha$ of FIG. 4 can be calculated as the following Equation 1. Wherein $\alpha$ represents a distance between a central point of a virtual area (V of FIG. 5) and the digital photographing apparatus 200.

$$\alpha = \frac{h}{\cos\theta} \quad \text{[Equation 1]}$$

The virtual area V, which is a virtual area formed on a vertical surface to a line of sight direction of the digital photographing apparatus 200, has a difference from the geographical region R where the actual subject is photographed. In the case where the images are photographed by the digital photographing apparatus 200, the ratio of width*length is defined, such that there is the virtual area V having a predetermined ratio of width*length on the virtual surface vertical to the line of sight direction with respect to the geographical region R actually photographed as shown in FIGS. 5 and 6.

Figure 5:
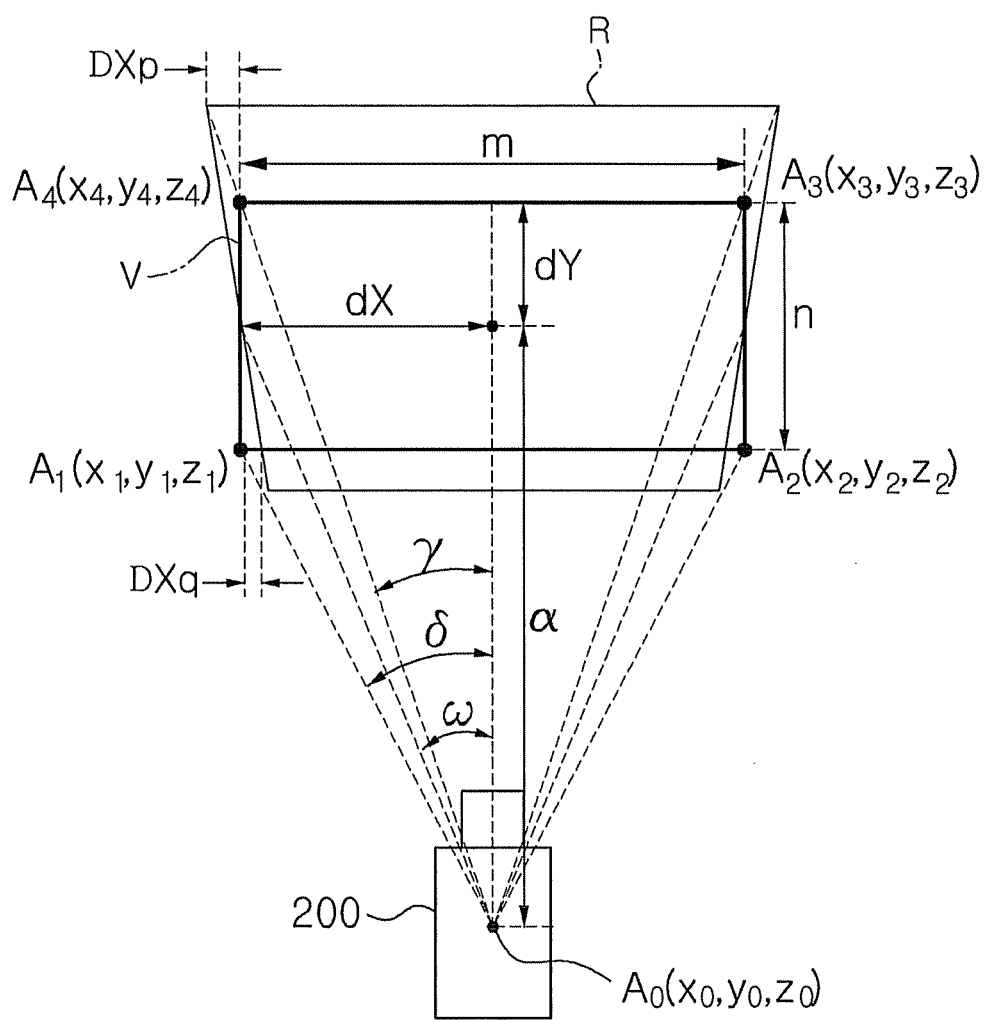
Figure 6:
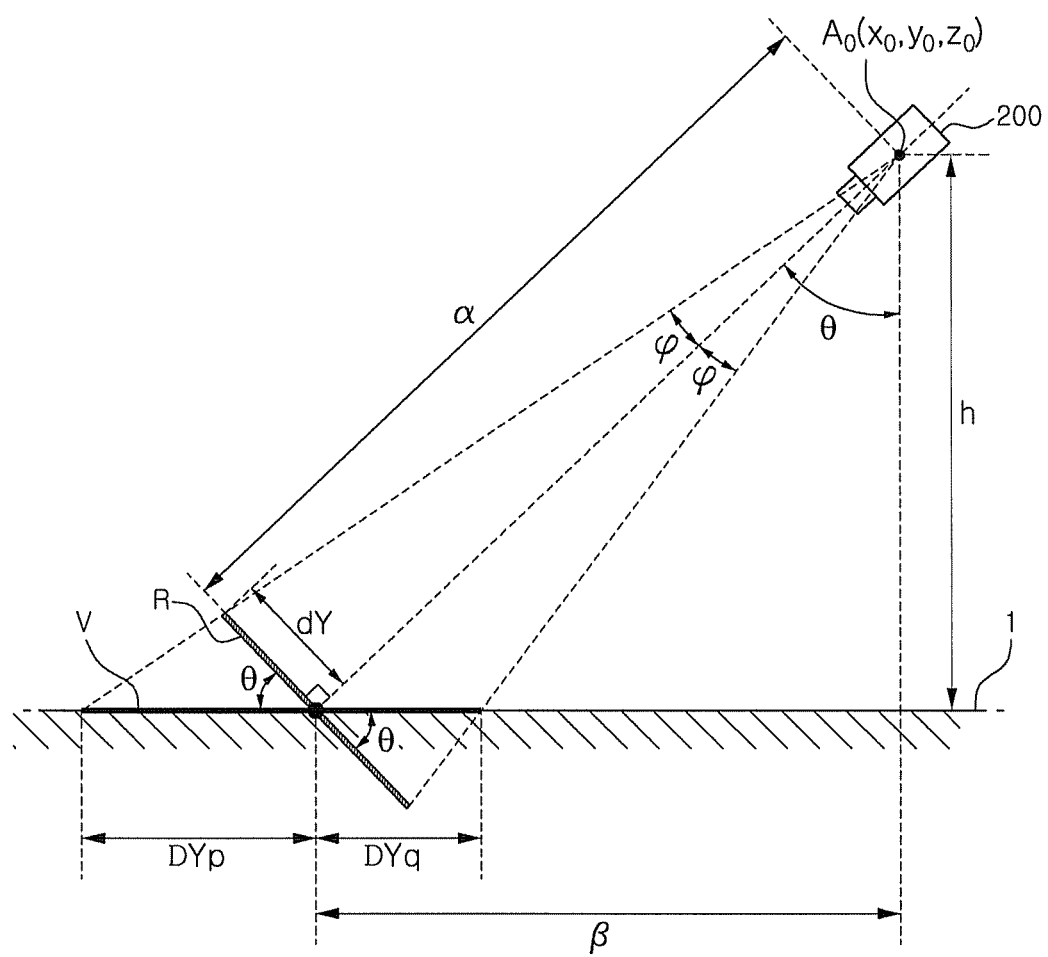

When using a $\alpha$ value calculated by Equation 1, a dX value in the virtual area shown in FIG. 5 can be calculated using the following Equation 2.

$$dX = \alpha \cdot \tan\omega \quad \text{[Equation 2]}$$
$$dX = h \cdot \frac{\tan\omega}{\cos\theta}$$

When calculating the dX value by Equation 2, a dY value in the virtual area V can be calculated. In other words, the ratio of width*length of the image photographed by the digital photographing apparatus 200 is defined, such that if the ratio of width*length of the digital image is m:n, the dY value can be calculated through the following Equation 3.

$$dY = dX \cdot \frac{n}{m} \quad \text{[Equation 3]}$$

$\phi$ value of FIG. 6 can be calculated using the dY value calculated by Equation 3 and the $\alpha$ value calculated through Equation 1. $\phi$ represents an angle formed between a perpendicular line connecting $A_0$ and the central point of the virtual area V and a straight line connecting a point away by dY from the central point of the virtual area V and $A_0$.

A y coordinate can be calculated by the following Equations 4 and 5. First, $\Delta Yp$ of FIG. 6 is calculated by Equation 4 and $\Delta Yq$ of FIG. 6 is calculated by Equation 5.

$$\Delta Yp = \alpha \cdot \frac{\tan\omega}{\cos\theta} \cdot \frac{n}{m} \quad \text{[Equation 4]}$$

$$\Delta Yq = h \cdot \tan\theta - h \cdot \tan(\theta - \varphi) \quad \text{[Equation 5]}$$

Equations 4 and 5 are equations obtaining an actual distance difference between the images photographed by the digital photographing apparatus 200. In other words, $\Delta Yp$ and $\Delta Yq$ each represents the distance to be spaced in a y-axis direction from the central point of the virtual area V on the actual geographical region.

Using so calculated $\Delta Yp$ and $\Delta Yq$, a y coordinate of the geographical region R actually photographed shown in FIG. 6 can be obtained.

Since the embodiment of the present invention describes a case where the digital photographing apparatus 200 photographs northward in the north hemisphere, $y_1$ is equal to $y_2$ and $y_3$ is equal to $y_4$. Therefore, y coordinates ($y_1, y_2, y_3, y_4$) of the geographical region R of each vertex of the image photographed by the digital photographing apparatus 200 can be calculated as follows.

$$y_1 = y_2 \quad \text{[Equation 6]}$$
$$= y_0 + \beta - \Delta Yq$$
$$= y_0 + (h \cdot \tan\theta) - (h \cdot \tan\theta - h \cdot \tan(\theta - \varphi))$$

$$y_3 = y_4 \quad \text{[Equation 7]}$$
$$= y_0 + \beta + \Delta Yp$$
$$= y_0 + (h \cdot \tan\theta) + \left(\alpha \cdot \frac{\tan\omega}{\cos\theta} \cdot \frac{n}{m}\right)$$

$\gamma$, $\delta$ values shown in FIG. 5 can be calculated using the derived values ($\Delta Yp$, $\Delta Yq$, $\alpha$, ...) from the above Equations. In more detail, the length of the straight line connecting from the central point of the virtual area V to the point to be spaced in the y-axis direction by dY, starting $A_0$, can be calculated using $\alpha$ and $\phi$ of FIG. 6. The $\gamma$, $\delta$ values can be calculated by the length of calculated straight line and dX.

Equations 8 and 9 are equations obtaining an actual distance difference between the images photographed by the digital photographing apparatus 200. In other words, $\Delta Xp$ and $\Delta Xq$ represent the distance difference in an x-axis direction generated between the vertex of the virtual area V and the actually photographed geographical region R.

$$\Delta Xp = \tan\gamma \cdot \left[\left(\frac{h}{\cos(\theta + \varphi)} - \frac{\alpha}{\cos\varphi}\right)\right] \quad \text{[Equation 8]}$$

$$\Delta Xq = \tan\delta \cdot \left\{\left(\frac{\alpha}{\cos\theta} - \frac{h}{\cos(\theta-\varphi)}\right)\right\} \quad \text{[Equation 9]}$$

When deriving ΔXp and ΔXq by Equations 8 and 9, an x coordinate of the photographed images can be calculated using Equation 10. X coordinates ($x_1$, $x_2$, $x_3$, $x_4$) of the geographical region R of each vertex of the images by photographed by the digital photographing apparatus 200 can be obtained as the following Equation 10.

$$x_1 = x_0 - dX + \Delta Xq \quad \text{[Equation 10]}$$
$$= x_0 - \alpha \cdot \tan\omega + \tan\delta \cdot \left\{\left(\frac{\alpha}{\cos\theta} - \frac{h}{\cos(\theta-\varphi)}\right)\right\}$$
$$x_2 = x_0 + dX - \Delta Xq$$
$$= x_0 + \alpha \cdot \tan\omega - \tan\delta \cdot \left\{\left(\frac{\alpha}{\cos\theta} - \frac{h}{\cos(\theta-\varphi)}\right)\right\}$$
$$x_3 = x_0 + dX + \Delta Xp$$
$$= x_0 + \alpha \cdot \tan\omega + \tan\gamma \cdot \left\{\left(\frac{h}{\cos(\theta+\varphi)} - \frac{\alpha}{\cos\varphi}\right)\right\}$$
$$x_4 = x_0 - dX - \Delta Xp$$
$$= x_0 - \alpha \cdot \tan\omega + \tan\gamma \cdot \left\{\left(\frac{h}{\cos(\theta+\varphi)} - \frac{\alpha}{\cos\varphi}\right)\right\}$$

In the same way, z coordinates ($z_1$, $z_2$, $z_3$, $z_4$) of the geographical region R of each vertex of the image photographed by the digital photographing apparatus 200 can be calculated as follows.

$$Z_1 = Z_2 = Z_3 = Z_4 = (Z_0 - h) \quad \text{[Equation 11]}$$

With the foregoing, the spatial coordinates calculator 200 according to the present invention can calculate the 3D spatial coordinates $A_1$, $A_2$, $A_3$, and $A_4$ of a geographical region of each vertex of the photographed images using the positional information, directional information, posture information, and device information that are obtained through the positional information acquiring unit 20, the directional information acquiring unit 30, the posture information acquiring unit 40, and the device information acquiring unit 50. The 3D spatial coordinates of the acquired images are analyzed and processed, such that they can be usually used in a geographic information system (GIS), a location based service (LES), a telematics service, a monitoring service, etc.

Figure 7:
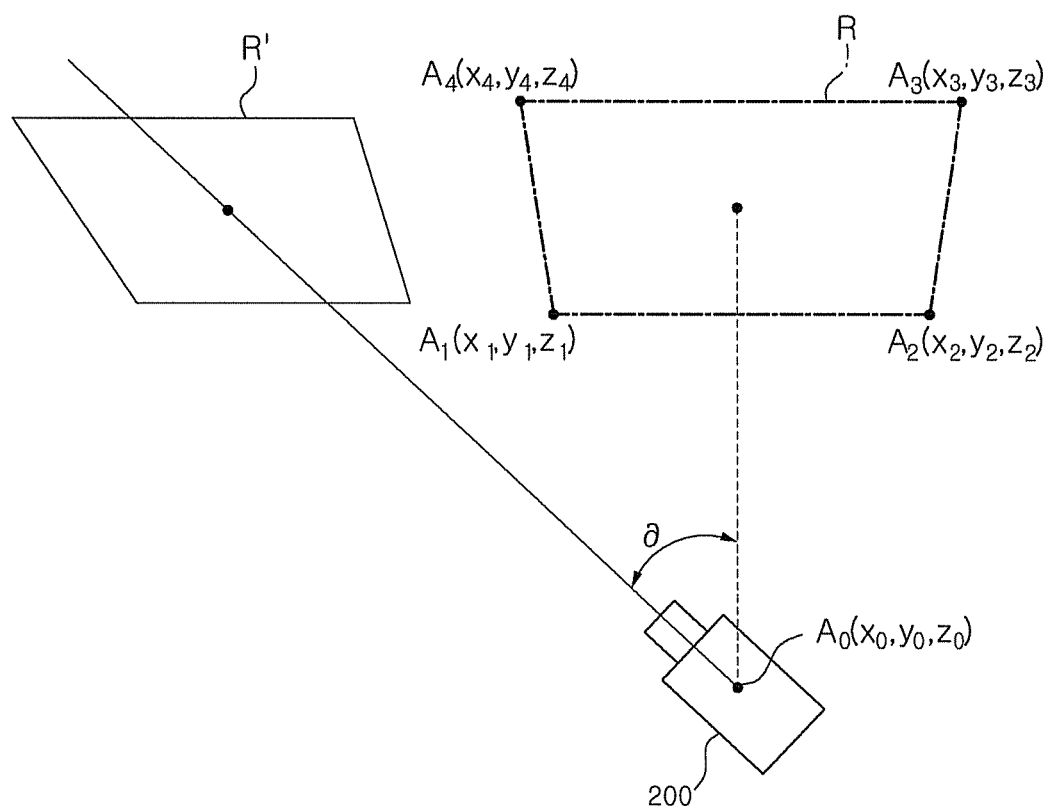

Meanwhile, the embodiments described through FIGS. 3 to 6 describe, for example, a case where the directional angle (azimuth angle ∂) for the line of sight direction of the digital photographing apparatus 200 is not given. However, as shown in FIG. 7, even when the directional angle is given, it is possible to calculate the 3D spatial coordinates of the digital images through a principle as described above. Since this can be derived through the specification by those skilled in the art, the detailed description thereof will be omitted in the embodiment of the present invention.

FIG. 8 is a flowchart for explaining an image photographing method of the digital photographing apparatus according to the present invention.

First, the digital photographing apparatus 200 according to the present invention photographs the image of the subject positioned at the line of sight direction of the lens and converts the photographed images to acquire the digital image data (S100). For example, the image processor 14 converts the photographed image into a standard scheme such as JPEG, MPEG4, H.264, etc. in order to meet a format set by the user or increase the storage efficiency.

The digital photographing apparatus 200 acquires the positional information (3D spatial coordinate) and the directional information (yaw angle) and the posture information (roll angle and pitch angle) of the line of sight direction of the lens at the time of photographing. For example, the digital photographing apparatus 200 can obtain the positional information using the GPS, Galileo, GLONASS satellite, etc. and can obtain the directional information using the electrical compass such as a geomagnetic sensor or a digital azimuth sensor and can obtain the posture information using a magnetic sensor such as a tilt sensor.

The digital photographing apparatus 200 obtains the device information (for example, view angle information, zoom in/zoom out information, etc) (S120).

The foregoing steps S110 and 5120 are simultaneously performed with step S100. In other words, the digital photographing apparatus 200 acquires the foregoing positional information, directional information, posture information, and device information at the time of photographing the subject.

Next, the digital photographing apparatus 200 determines whether the 3D spatial coordinates calculation of the geographical region of each vertex of the photographed images can be performed by using the information acquired through steps S110 and S120 as parameters (S130).

As the determination result at step S130, if the 3D spatial coordinates calculation of the geographical region of each vertex of the photographed images can be performed, the 3D spatial coordinates calculation can be performed (S140) and if not, it proceeds to step S170.

The digital photographing apparatus 200 determines whether the 3D spatial coordinates of the photographed images can be stored together with the image data based on the format storing the digital image data in the storage unit (S150). If so, the digital image data and the 3D spatial coordinates are combined as described at step S160 and if not, it proceeds to step S170.

When the 3D spatial coordinates of the photographed images cannot be calculated or the 3D spatial coordinates are not stored together with the digital image data, it is determined whether the positional information, directional information, posture information, and device information, and device information obtained through steps S110 and S120 are independently stored together with the image data (S170).

As the determination result of step S170, when the acquired positional information, directional information, posture information, and device information are stored together with the image data, the image data are combined with the acquired information, which are in turn stored in the storage unit. Then, the process ends (S180 and S190).

At the determination result of step S170, when the acquired positional information, directional information, posture information, and device information are not stored together with the image data, the image data that does not include the specific information are stored in the storage unit. Then, the process ends. Meanwhile, the determination result at steps S150 and S170 is determined according to the input from the user.

With the foregoing description, it is possible to calculate the 3D spatial coordinates of the geographical region of each vertex of the photographed images using the positional information, directional information, posture information, and device information. The 3D spatial coordinates of the acquired images are analyzed and processed, such that they can be usually used in a geographic information system (GIS), a location based service (LBS), a telematics service, a monitoring service, etc. For example, the present invention accurately maps the photographed image using the 3D spatial coordinates of the photographed images to real geographical features, making it possible to increase the utilization of the 3D virtual space service or the downtown monitoring service.

The present invention can be implemented as a computer-readable code in a computer-readable recording medium. The computer-readable recording media includes all types of recording apparatuses in which data readable by a computer system is stored. Examples of the computer-readable recording media may include a ROM, a RAM, a CD-ROM, a magnetic tape, a floppy disk, an optical data storage, etc. In addition, the computer-readable recording media also include one implemented in the form of a carrier wave (i.e., transmission through the Internet). Further, the computer-readable recording media are distributed on systems connected over the network, and are stored and executed as the computer-readable code by a distribution method.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus, comprising:
   a digital photographing apparatus for calculating 3D spatial coordinates of digital images, comprising:
   an image acquiring unit that acquires images by photographing a subject;
   a sensor information acquiring unit that acquires positional information, directional information, and posture information of the digital photographing apparatus at the time of photographing a subject;
   a device information acquiring unit that acquires device information of the digital photographing apparatus at the time of photographing a subject; and
   a spatial coordinates calculator that calculates 3D spatial coordinates of photographed images using the acquired positional information, directional information, posture information, and device information,
   wherein the device information of the digital photographing apparatus includes at least one of view angle information, focal length information, expansion information, and reduction information,
   wherein the sensor information acquiring unit includes a directional information acquiring unit and the directional information acquiring unit acquires the directional information of the digital photographing apparatus using a geomagnetic sensor,
   wherein the sensor information acquiring unit includes a posture information acquiring unit and the directional information acquiring unit acquires the posture information of the digital photographing apparatus using a tilt sensor.

2. The digital photographing apparatus according to claim 1, wherein the spatial coordinates calculator calculates the 3D spatial coordinates of a geographical region for each vertex of the images.

3. The digital photographing apparatus according to claim 1, wherein the directional information of the digital photographing apparatus is yaw angle information of the digital photographing apparatus.

4. The digital photographing apparatus according to claim 1, wherein the posture information of the digital photographing apparatus is roll angle information and pitch angle information of the digital photographing apparatus.

5. The digital photographing apparatus according to claim 1, wherein the sensor information acquiring unit includes a positional information acquiring unit and the positional information acquiring unit acquires the positional information of the digital photographing apparatus using information received from any one of a GPS satellite, a Galileo satellite, and a GLONASS satellite.

6. The digital photographing apparatus according to claim 1, wherein the digital photographing apparatus further includes an image output unit that displays the 3D spatial coordinates of images together with the images.

7. The digital photographing apparatus according to claim 1, further comprising a data storage unit that stores at least one of the acquired positional information, directional information, posture information, device information, and 3D spatial coordinates of the images together with the photographed images.

* * * * *